(12) United States Patent
Lavalle

(10) Patent No.: US 7,360,317 B1
(45) Date of Patent: Apr. 22, 2008

(54) LEVEL HAVING AN ADJUSTABLE MECHANISM FOR TRUING TO ACQUIRE AN EXACT READING

(76) Inventor: Stephen T. Lavalle, P.O. Box 114, Bellport, NY (US) 11713

( * ) Notice: Subject to any disclaimer, the term of this patent is extended or adjusted under 35 U.S.C. 154(b) by 0 days.

(21) Appl. No.: 11/508,501

(22) Filed: Aug. 23, 2006

(51) Int. Cl.
*G01C 9/24* (2006.01)

(52) U.S. Cl. .......................................... 33/384

(58) Field of Classification Search .................. 33/374, 33/375, 384, 385, 386, 387, 388; D10/69
See application file for complete search history.

(56) References Cited

U.S. PATENT DOCUMENTS

| | | | | |
|---|---|---|---|---|
| 565,096 | A | * | 8/1896 | Traut ............................ 33/385 |
| 1,052,447 | A | * | 2/1913 | Armstrong .................... 33/350 |
| 1,362,813 | A | * | 12/1920 | Neidl ........................... 33/350 |
| 1,393,328 | A | * | 10/1921 | Thullen ........................ 33/381 |
| 1,498,158 | A | * | 6/1924 | Eden ............................ 33/388 |
| 1,630,122 | A | * | 5/1927 | Ivarson ........................ 33/385 |
| 2,304,313 | A | * | 12/1942 | Misz ............................ 33/386 |
| 2,594,543 | A | | 4/1952 | Douglas |
| 4,150,492 | A | | 4/1979 | Tracy |
| 4,635,414 | A | | 1/1987 | Allen |
| 4,843,724 | A | * | 7/1989 | Greenland .................... 33/386 |
| 4,928,395 | A | * | 5/1990 | Good ........................... 33/374 |
| 4,999,921 | A | * | 3/1991 | Bird et al. .................... 33/388 |
| 5,001,838 | A | * | 3/1991 | Huxley et al. ................ 33/388 |
| 5,111,589 | A | * | 5/1992 | Tate ............................. 33/385 |
| 6,176,020 | B1 | * | 1/2001 | Scarborough ................ 33/379 |
| 6,550,152 | B2 | | 4/2003 | Myrick |

FOREIGN PATENT DOCUMENTS

GB 2252164 A * 7/1992

* cited by examiner

*Primary Examiner*—R. Alexander Smith
(74) *Attorney, Agent, or Firm*—Richard L. Miller

(57) ABSTRACT

A level having an adjustable mechanism for truing to acquire an exact reading which comprises an elongated rigid body being an I-shaped frame having a web with a first flange transversely extending across a first long end of the web and a second flange transversely extending across a second long end of the web. A first bubble vial is mounted in a parallel relationship within the center of a first elongated rectangular plate for taking horizontal measurements. A second bubble vial is mounted in a transverse relationship within the center of a second elongated rectangular plate for taking vertical measurements. A mechanism is for securing the first elongated rectangular plate in an adjustable manner to one face of the web and the second elongated rectangular plate in an adjustable manner to an opposite face of the web. The first bubble vial in the first elongated rectangular plate and the second bubble vial in the second elongated rectangular plate can be adjusted true with respect to the web to acquire an exact reading when being used for the horizontal and vertical measurements.

1 Claim, 2 Drawing Sheets

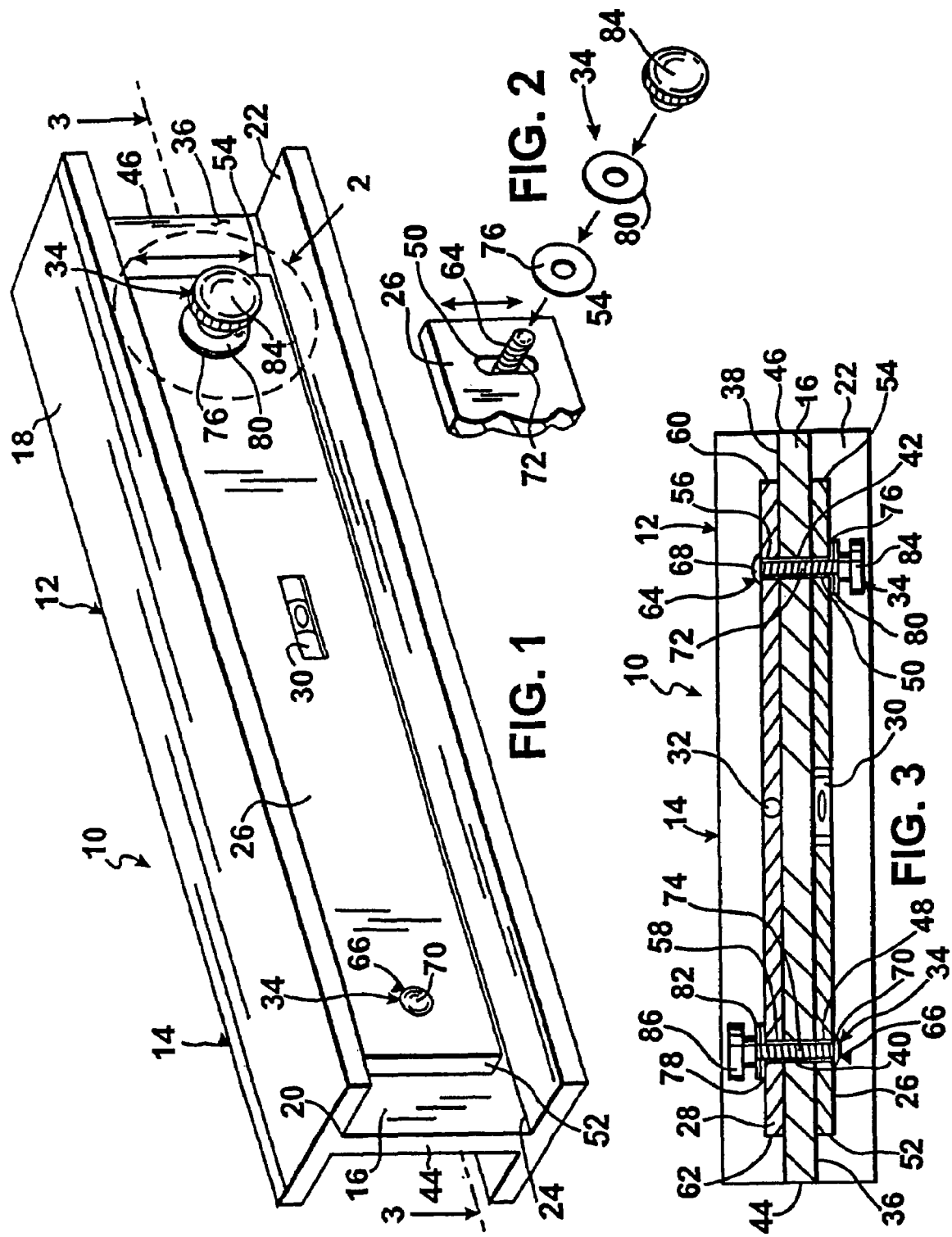

LEVEL HAVING AN ADJUSTABLE MECHANISM FOR TRUING TO ACQUIRE AN EXACT READING

BACKGROUND OF THE INVENTION

1. Field of the Invention

The present invention relates to a leveling device, and more particularly, a level having an adjustable mechanism for truing to acquire an exact reading.

2. Description of the Prior Art

Numerous innovations for adjustable levels have been provided in the prior art that will be described. Even though these innovations may be suitable for the specific individual purposes to which they address, however, they differ from the present invention.

A FIRST EXAMPLE, U.S. Pat. No. 2,594,543, Issued on Apr. 29, 1952, to Douglas teaches a plumbers's level having an elongated one-piece rectangular frame having top, bottom and end portions which are T-shaped in cross-section and having webs spaced from each of its end portion and joining the top and bottom portions. The bottom portion has an enlargement therein provided with a threaded bore whose axis is at right angles to the longitudinal axis of the frame. An adjusting screw is threadably mounted in the bore. The screw has a screw driver slot in its lower end, while a lock nut is threadably mounted on the screw immediately above the enlargement.

A SECOND EXAMPLE, U.S. Pat. No. 4,150,492, Issued on Apr. 4, 1979, to Tracy teaches a precision level that has a level indicating means and is turned end for end to determine the amount one point on which the end of the level rests must be changed in height with respect to a point at the other end of the level to have the points on a horizontal line. A mounting through one end of the main body of the present level positions a conventional differential dial indicator above a foot that is adjustable in height, and the sensing stem of the indicator follows the upper end of the foot to show the amount the points must be changed in height to position the points on a horizontal line. For levels of different lengths, sections for the main body are connected together. Latching assemblies for joining the scions have hook-shaped members mounted on eccentric pins, the pins being rotated to pull the sections tightly together.

A THIRD EXAMPLE, U.S. Pat. No. 4,635,414, Issued on Jan. 13, 1987, to Allen teaches a device for use in positioning and securing a door jamb in a level condition. The device includes a spacer plate assembly having outer end portions which extend beneath the inner portion of the sides of the jamb during the leveling process. A pair of bolt shaped members are threadedly received in the spacer plate assembly, one at each end thereof, to provide a means of raising and lowering the ends of the spacer plate assembly. A suitable level indicating unit such as a carpenter's level is also mounted on the spacer plate. The device further includes a pair of anchor base plates which are mounted in the floor, one at each end of the spacer plate, adjacent the lip extensions. The bolt members are rotated until the level indicating unit shows the spacer plate to be in a level condition, at which time each side of the door jamb is fixed to the respective anchor base plate by anchor screws or similar means. The spacer assembly is then withdrawn, leaving the door jamb mounted in a level condition on the anchor base plates. In one embodiment, the spacer plate assembly is provided with means at each end thereof for adjusting the length of the assembly so as to fit door jambs of various widths.

A FOURTH EXAMPLE, U.S. Pat. No. 6,550,152 B2, on Apr. 22, 2003, to Myrick teaches a spirit level for the installation of tile and cabinets that includes a rigid body having upper and lower parallel planar surfaces separated by a first predetermined width. The body includes a bubble vial oriented to verify the orientation of the level. An auxiliary edge portion has a planar top surface and lower supporting edges parallel to the top surface separated by a second predetermined width. Means are provided for removably attaching the auxiliary edge portion to the upper planar surface of the body, thereby providing a level having two standard widths corresponding to industry standard tiles. A series of evenly spaced holes are provided for removably securing the body to a flat surface. The ends of the body include parallel planar end surfaces normal to the upper and lower planar surfaces. A threaded hole is provided penetrating the surface of the body. A threaded setscrew is provided to engage the threaded hole and to bear upon the auxiliary edge. An adjusting notch is provided with a recessed planar surface is disposed at either end of the body at the planar lower surface. A threaded opening is provided centrally located in the recessed planar surface. A threaded bolt to engage the threaded opening is provided and is of sufficient length to extend outwardly from the threaded opening to a point beyond the planar lower surface when unscrewed from the nut so as to adjust the level to uneven surfaces.

It is apparent now that numerous innovations for adjustable levels have been provided in the prior art that are adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a level having an adjustable mechanism for truing to acquire an exact reading that avoids the disadvantages of the prior art.

ANOTHER OBJECT of the present invention is to provide a level having an adjustable mechanism for truing to acquire an exact reading that is simple and inexpensive to manufacture.

STILL ANOTHER OBJECT of the present invention is to provide a level having an adjustable mechanism for truing to acquire an exact reading that is simple to use.

BRIEFLY STATED, STILL YET ANOTHER OBJECT of the present invention is to provide a level having an adjustable mechanism for truing to acquire an exact reading which comprises an elongated rigid body being an I-shaped frame having a web with a first flange transversely extending across a first long end of the web and a second flange transversely extending across a second long end of the web. A first bubble vial is mounted in a parallel relationship within the center of a first elongated rectangular plate for taking horizontal measurements. A second bubble vial is mounted in a transverse relationship within the center of a second elongated rectangular plate for taking vertical measurements. A mechanism is for securing the first elongated rectangular plate in an adjustable manner to one face of the web and the second elongated rectangular plate in an adjustable manner to an opposite face of the web. The first bubble vial in the first elongated rectangular plate and the second bubble vial in the second elongated rectangular plate can be adjusted true with respect to the web to acquire an exact reading when being used for the horizontal and vertical measurements.

In order for a level to be accurate, the bubble vial of the level needs to be perfectly parallel to the long edge of the level or perfectly perpendicular in the case of plumb. With that said, two advantages unique to the present invention are as follows:

1. The user of the present invention can make adjustments to their hearts content until they are satisfied with the accuracy; and
2. The present invention, unlike conventional levels, does not need to be calibrated in the factory when manufactured, this aspect will drastically reduce the cost of production to the manufacturer.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows:

FIG. 1 is a diagrammatic perspective view of the present invention;

FIG. 2 is a diagrammatic exploded perspective view, with parts broken away, of the area enclosed in the dotted curve indicated by arrow 2 in FIG. 1;

FIG. 3 is a cross sectional view taken on line 3-3 of FIG. 1;

A MARSHALLING OF REFERENCE NUMERALS UTILIZED IN THE DRAWING

Figure 4:
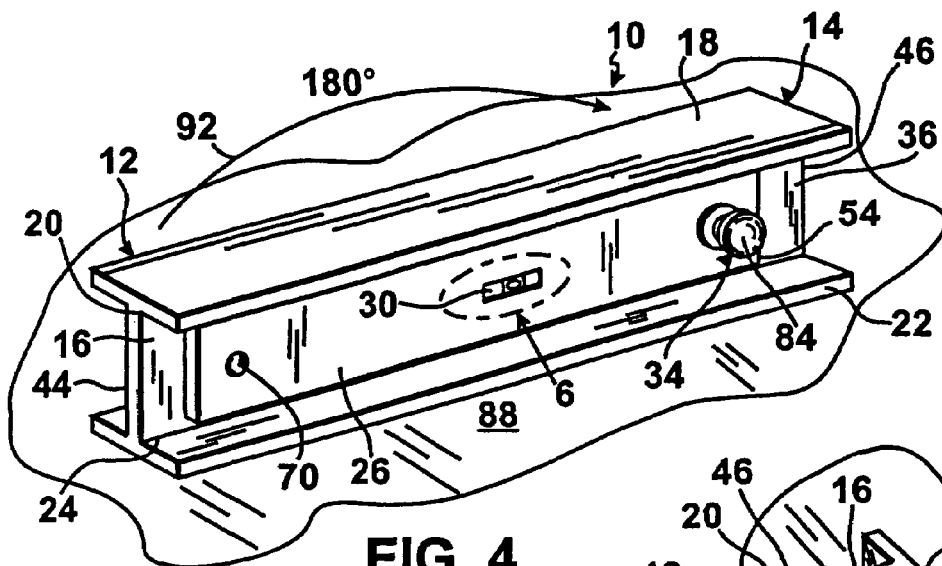
FIG. 4 is a diagrammatic perspective view of the present invention being used on a horizontal surface as a level device that can be adjusted true by rotating it 180 degrees.
Figure 6:
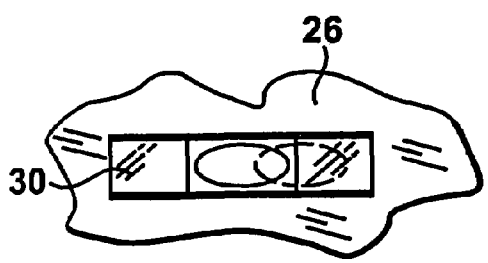
FIG. 6 is an enlarged diagrammatic elevational view of the area enclosed in the dotted curve indicated by arrow 6 in FIG. 5, showing how the bubble within the vial moves to a center position when the device is true.

10 level
12 elongated rigid body of level 10
14 I-shaped frame for elongated rigid body 12
16 web of I-shaped frame 14
18 first flange of I-shaped frame 14
20 first long end of web 16
22 second flange of I-shaped frame 14
24 second long end of web 16
26 first elongated rectangular plate of level 10
28 second elongated rectangular plate of level 10
30 first bubble vial of level 10
32 second bubble vial of level 10
34 adjustable securing mechanism of level 10
36 first face of web 16
38 second face of web 16
40 first aperture in web 16
42 second aperture in web 16
44 first short end of web 16
46 second short end of web 16
48 aperture in first elongated rectangular plate 26
50 slot in first elongated rectangular plate 26
52 first short end of first elongated rectangular plate 26
54 second short end of first elongated rectangular plate 26
56 aperture in second elongated rectangular plate 28
58 slot in second elongated rectangular plate 28
60 first short end of second elongated rectangular plate 28
62 second short end of second elongated rectangular plate 28
64 first bolt of adjustable securing mechanism 34
66 second bolt of adjustable securing mechanism 34
68 enlarged head of first bolt 64
70 enlarged head of second bolt 66
72 threaded shank of first bolt 64
74 threaded shank of second bolt 66
76 first resilient washer of adjustable securing mechanism 34
78 second resilient washer of adjustable securing mechanism 34
80 first rigid washer of adjustable securing mechanism 34
82 second rigid washer of adjustable securing mechanism 34
84 first knob of adjustable securing mechanism 34
86 second knob of adjustable securing mechanism 34
88 horizontal surface
90 vertical surface
92 re-orientation arrow
94 re-orientation arrow

DETAILED DESCRIPTION OF THE PREFERRED EMBODIMENT

Figure 5:
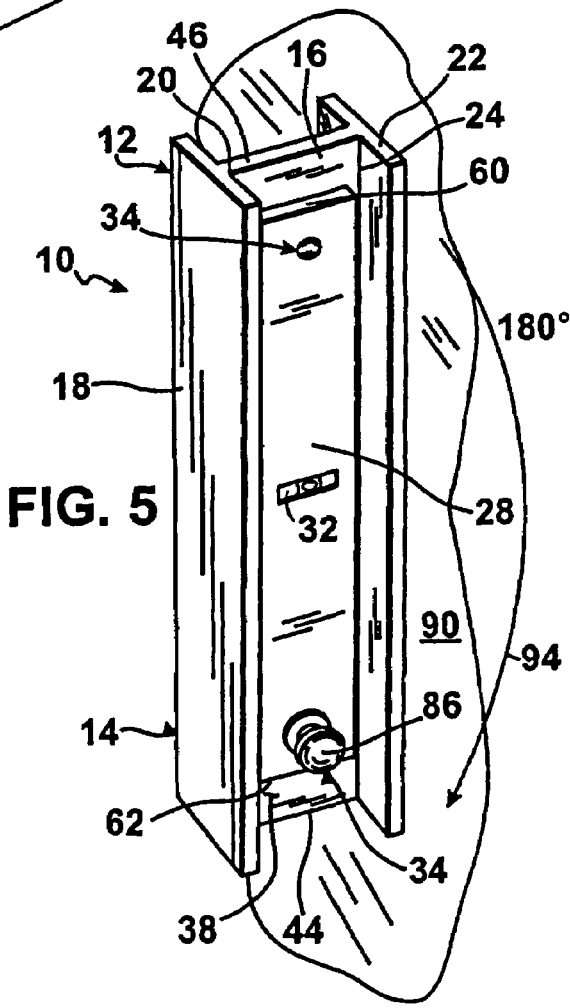
FIG. 5 is a diagrammatic perspective view of the present invention being used on a vertical surface as a plumb device that can be adjusted true by rotating it 180 degrees.

Referring now to the figures, in which like numerals indicate like parts, and particularly to FIGS. 1 through 6, which are a diagrammatic perspective view of the present invention; a diagrammatic exploded perspective view, with parts broken away, of the area enclosed in the dotted curve indicated by arrow 2 in FIG. 1; a cross sectional view taken on line 3-3 of FIG. 1; a diagrammatic perspective view of the present invention being used on a horizontal surface as a level device that can be adjusted true by rotating it 180 degrees; a diagrammatic perspective view of the present invention being used on a vertical surface as a plumb device that can be adjusted true by rotating it 180 degrees; and an enlarged diagrammatic elevational view of the area enclosed in the dotted curve indicated by arrow 6 in FIG. 5, showing how the bubble within the vial moves to a center position when the device is true, and as such, will be discussed with reference thereto.

The present invention is a level 10 having an adjustable mechanism for truing to acquire an exact reading which comprises an elongated rigid body 12 being an I-shaped, or other suitable shaped, frame 14 having a web 16 with a first flange 18 transversely extending across a first long end 20 of the web 16 and a second flange 22 transversely extending across a second long end 24 of the web 16. A first elongated rectangular plate 26 and a second elongated rectangular plate 28 are provided. A first bubble vial 30 is mounted in a parallel relationship within the center of the first elongated rectangular plate 26 for taking horizontal measurements. A second bubble vial 32 is mounted in a transverse relationship within center of the second elongated rectangular plate 28 for taking vertical measurements.

A mechanism 34 is for securing the first elongated rectangular plate 26 in an adjustable manner to one face 36 of the web 16 and the second elongated rectangular plate 28 in an adjustable manner to an opposite face 38 of the web 16. The first bubble vial 30 in the first elongated rectangular plate 26 and the second bubble vial 32 in the second elongated rectangular plate 28 can be adjusted true with respect to the web 16 to acquire an exact reading when being used for the horizontal and vertical measurements (see FIGS. 4, 5 and 6).

The adjustable securing mechanism 34, as best seen in FIG. 3, comprises the web 16 having a pair of apertures 40, 42. The first aperture 40 is positioned centrally near a first short end 44 of the web 16. The second aperture 42 is positioned centrally near a second short end 46 of the web 16.

The first elongated rectangular plate 26 has an aperture 48 and a slot 50. The aperture 48 is positioned centrally near a first short end 52 of the first elongated rectangular plate 26, while the slot 50 is positioned parallel to and near a second short end 54 of the first elongated rectangular plate 26. The aperture 48 in the first elongated rectangular plate 26 is in alignment with the first aperture 40 in the web 16. The slot 50 in the first elongated rectangular plate 26 is in alignment with the second aperture 42 in the web 16.

The second elongated rectangular plate 28 has an aperture 56 and a slot 58. The aperture 56 is positioned centrally near a first short end 60 of the second elongated rectangular plate 28, while the slot 58 is positioned parallel to and near a second short end 62 of the second elongated rectangular plate 28. The aperture 56 in the second elongated rectangular plate 28 is in alignment with the second aperture 42 in the web 16. The slot 58 in the second elongated rectangular plate 28 is in alignment with the first aperture 40 in the web 16.

A pair of bolts 64, 66 are provided. Each bolt 64, 66 has an enlarged head 68, 70 with a threaded shank 72, 74. The threaded shank 72 of the first bolt 64 is inserted through the aperture 56 in the second elongated rectangular plate 28, the second aperture 42 in the web 16 and the slot 50 in the first elongated rectangular plate 26.

The threaded shank 74 of the second bolt 66 is inserted through the aperture 48 in the first elongated plate 26, the first aperture 40 in the web 16 and the slot 58 in the second elongated rectangular plate 28, so that the pair of bolts 64, 66 are positioned oppositely from each other. A pair of resilient washers 76, 78 are provided. The first resilient washer 76 is placed onto the threaded shank 72 of the first bolt 64, while the second resilient washer 78 is placed onto the threaded shank 74 of the second bolt 66. A pair of rigid washers 80, 82 are provided. The first rigid washer 80 is placed onto the threaded shank 72 of the first bolt 64, while the second rigid washer 82 is placed onto the threaded shank 74 of the second bolt 66.

A pair of knobs 84, 86 are also provided. The first knob 84 is threaded onto a free end of the threaded shank 72 of the first bolt 64, while the second knob 86 is threaded onto a free end of the threaded shank 74 of the second bolt 66. When the first knob 84 is manually loosened on the threaded shank 72 of the first bolt 64, the first elongated rectangular plate 26 can be adjusted to position the first bubble vial 30 true for horizontal measurements. When the first knob 84 is manually tightened on the threaded shank 72 of the first bolt 64, the first elongated rectangular plate 26 will be maintained in a stationary position, allowing the level 10 to be rotated 180 degrees on a horizontal surface 88 to check out the true reading of the first bubble vial 30 (see FIG. 4). When the second knob 86 is manually loosened on the threaded shank 74 of the second bolt 66, the second elongated rectangular plate 28 can be adjusted to position the second bubble vial 32 true for vertical measurements. When the second knob 86 is manually tightened on the threaded shank 74 of the second bolt 66, the second elongated rectangular plate 28 will be maintained in a stationary position, allowing the level 10 to be rotated 180 degrees on a vertical surface 90 to check out the true reading of the second bubble vial 32 (see FIG. 5).

In accordance with the invention thus described a first method of truing the level 10 to acquire an exact horizontal reading comprising the steps of:
1. Placing the level 10 on a substantially horizontal surface 88.
2. Recording a first reading for the first bubble vial 30 in the first elongated rectangular plate 26.
3. Replacing the level 10 on the same substantially horizontal surface 88, orientated 180 degrees from orientation in step 1, as indicated by re-orientation arrow 92.
4. Recording a second reading for the first bubble vial 30 in the first elongated rectangular plate 26.
5. Adjusting the first elongated rectangular plate 26 so that subsequent readings recorded in similar steps 2 and 4 are attempted to be made equal; and
6. Repeating steps 1 through 4 until readings recorded in similar subsequent steps 2 and 4 are equal.

In accordance with the invention thus described a second method of turing the level 10 to acquire an exact horizontal reading comprising the steps of:
1. Placing said level 10 on an exact known horizontal surface; and
2. Adjusting a first elongated rectangular plate 26 so that a first bubble vial 30 in the first elongated rectangular plate 26 has a bubble centered.

In accordance with the invention thus described a first method of truing the level 10 to acquire an exact vertical reading comprising the steps of:
1. Placing the level 10 on a substantially vertical surface 90.
2. Recording a first reading for the second bubble vial 32 in the second elongated rectangular plate 28.
3. Replacing the level 10 on the same substantially vertical surface 90, orientated 180 degrees from orientation in step 1, as indicated by re-orientation arrow 94.
4. Recording a second reading for the second bubble vial 32 in the second elongated rectangular plate 28.
5. Adjusting the second elongated rectangular plate 28 so that subsequent readings recorded in similar steps 2 and 4 are attempted to be made equal; and
6. Repeating steps 1 through 4 until readings recorded in similar subsequent steps 2 and 4 are equal.

In accordance with the invention thus described a second method of truing the level 10 to acquire an exact vertical reading comprising the steps of:
1. Placing said level 10 on an exact known vertical surface; and
2. Adjusting the second elongated rectangular plate 28 so that the second bubble vial 32 in the second elongated rectangular plate 28 has a bubble centered.

It will be understood that each of the elements described above, or two or more together, may also find a useful application in other types of constructions differing from the types described above.

While the invention has been illustrated and described as embodiments of a level having an adjustable mechanism for truing to acquire an exact reading, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A level having an adjustable mechanism for truing to acquire an exact reading which comprises:
   A) an elongated rigid body being an I-shaped frame having a web with a first flange transversely extending across a first long end of said web and a second flange transversely extending across a second long end of said web;
   B) a first elongated rectangular plate;
   C) a second elongated rectangular plate;
   D) a first bubble vial mounted in a parallel relationship within the center of said first elongated rectangular plate for taking horizontal measurements;
   E) a second bubble vial mounted in a transverse relationship within the center of said second elongated rectangular plate for taking vertical measurements; and
   F) means for securing said first elongated rectangular plate in an adjustable manner to one face of said web and said second elongated rectangular plate in an adjustable manner to an opposite face of said web, wherein said first bubble vial in said first elongated rectangular plate and said second bubble vial in said second elongated rectangular plate can be adjusted true with respect to said web to acquire an exact reading when being used for the horizontal and vertical measurements; wherein said means for securing further comprises:
      a) said web having a pair of apertures, in which said first aperture is positioned centrally near a first short end of said web, while said second aperture is positioned centrally near a second short end of said web;
      b) said first elongated rectangular plate having an aperture and a slot, wherein said aperture is positioned centrally near a first short end of said first elongated rectangular plate, while said slot is positioned parallel to and near a second short end of said first elongated rectangular plate, whereby said aperture in said first elongated rectangular plate is in alignment with said first aperture in said web and said slot in said first elongated rectangular plate is in alignment with said second aperture in said web;
      c) said second elongated rectangular plate having an aperture and a slot, wherein said aperture is positioned centrally near a first short end of said second elongated rectangular plate, while said slot is positioned parallel to and near a second short end of said second elongated rectangular plate, whereby said aperture in said second elongated rectangular plate is in alignment with said second aperture in said web and said slot in said second elongated rectangular plate is in alignment with said first aperture in said web;
      d) a pair of bolts, each said bolt having an enlarged head with a threaded shank, wherein said threaded shank of said first bolt is inserted through said aperture in said second elongated rectangular plate, said second aperture in said web and said slot in said first elongated rectangular plate, while said threaded shank of said second bolt is inserted through said aperture in said first elongated rectangular plate, said first aperture in said web and said slot in said second elongated rectangular plate, so that said pair of bolts are positioned oppositely from each other;
      e) a pair of resilient washers, wherein said first resilient washer is placed onto said threaded shank of said first bolt, while said second resilient washer is placed onto said threaded shank of said second bolt;
      f) a pair of rigid washers, wherein said first rigid washer is placed onto said threaded shank of said first bolt, while said second rigid washer is placed onto said threaded shank of said second bolt; and
      g) a pair of knobs, wherein said first knob is threaded onto a free end of said threaded shank of said first bolt, while said second knob is threaded onto a free end of said threaded shank of said second bolt so that when said first knob is manually loosened on said threaded shank of said first bolt, said first elongated rectangular plate can be adjusted to position said first bubble vial true for horizontal measurements, whereby when said first knob is manually tightened on said threaded shank of said first bolt, said first elongated rectangular plate will be maintained in a stationary position, and when said second knob is manually loosened on said threaded shank of said second bolt, said second elongated rectangular plate can be adjusted to position said second bubble vial true for vertical measurements, whereby when said second knob is manually tightened on said threaded shank of said second bolt, said second elongated rectangular plate will be maintained in a stationary position.

* * * * *